United States Patent
Greer, Jr.

(10) Patent No.: US 6,880,843 B1
(45) Date of Patent: Apr. 19, 2005

(54) VEHICLE STEP DEVICE

(76) Inventor: Melville T. Greer, Jr., 191 Country Air La., West Jefferson, NC (US) 28694

( * ) Notice: Subject to any disclaimer, the term of this patent is extended or adjusted under 35 U.S.C. 154(b) by 99 days.

(21) Appl. No.: 10/446,093

(22) Filed: May 28, 2003

(51) Int. Cl.⁷ .............................................. B60R 3/00
(52) U.S. Cl. .................................................... 280/166
(58) Field of Search ............................ 280/163, 164.1, 280/164.2, 166; 296/162; 182/91

(56) References Cited

U.S. PATENT DOCUMENTS

| | | | |
|---|---|---|---|
| 3,229,993 A | 1/1966 | Riddle | |
| 3,341,223 A * | 9/1967 | Wampfler | 280/166 |
| 3,645,557 A * | 2/1972 | Aldropp et al. | 280/166 |
| 3,671,058 A | 6/1972 | Kant | |
| 3,915,475 A | 10/1975 | Casela et al. | |
| 4,110,673 A * | 8/1978 | Magy et al. | 318/466 |
| 4,869,030 A * | 9/1989 | Clark | 52/79.6 |
| 5,228,707 A * | 7/1993 | Yoder | 280/166 |
| 5,342,073 A | 8/1994 | Poole | |
| 5,660,405 A * | 8/1997 | Campbell | 280/166 |
| 6,038,208 A | 3/2000 | Shikunami et al. | |
| 6,213,486 B1 * | 4/2001 | Kunz et al. | 280/166 |
| 6,357,773 B1 * | 3/2002 | Griebel et al. | 280/166 |
| 6,659,485 B1 * | 12/2003 | Ueno | 280/166 |

* cited by examiner

Primary Examiner—Bryan Fischmann

(57) ABSTRACT

A vehicle step device includes a base unit including a bottom wall and a pair of side walls that are attached to and extend upwardly from the bottom wall. The side walls are positioned opposite of each other and each has an top edge having one of a pair of brackets attached thereto for selectively coupling the base unit to a vehicle. Each of a pair of guides is mounted to an inner surface of one of the side walls. A panel has a pair of side edges. Each of a pair of rails is attached to and extends along one of the side edges. Each of the rails is positionable into one of the guides such that the panel is selectively positionable between an extended position extending outwardly of the base unit and a retracted position positioned inward of the base unit.

9 Claims, 3 Drawing Sheets

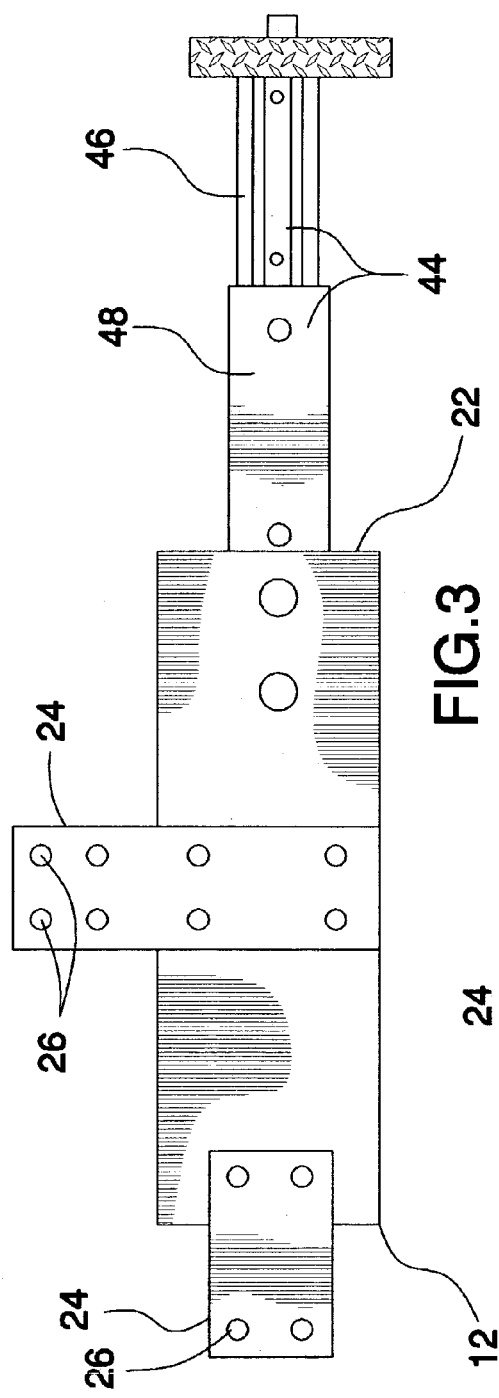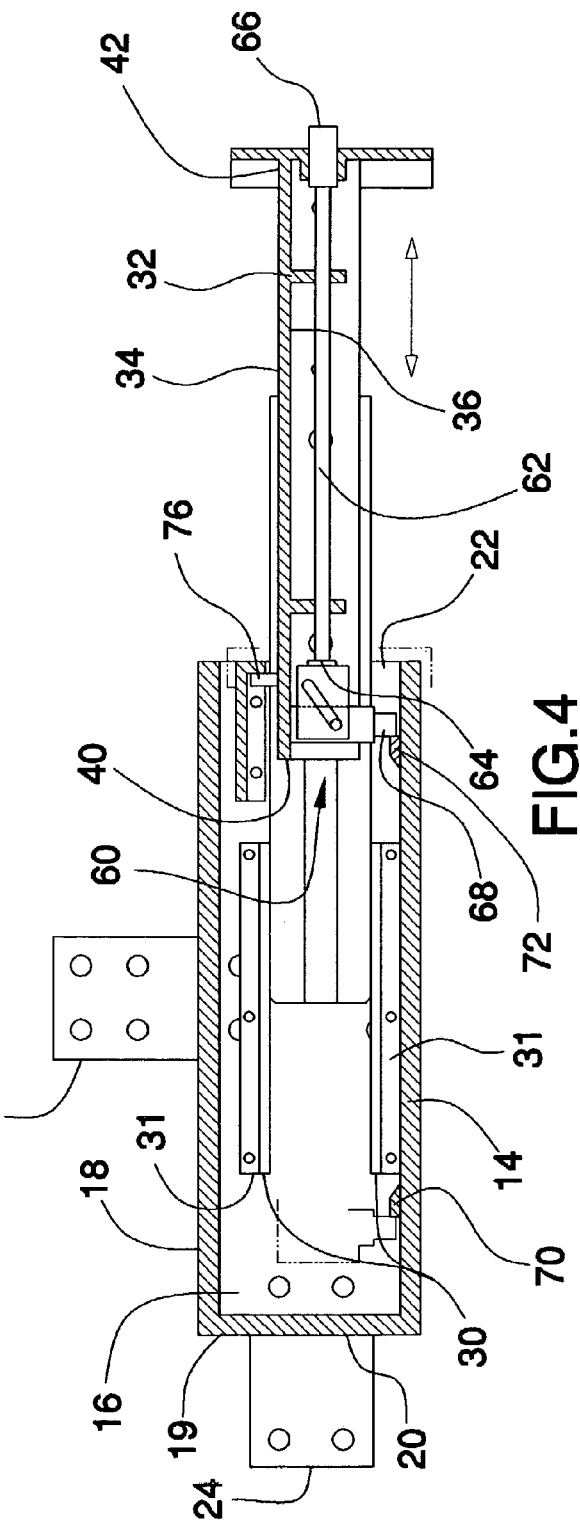

US 6,880,843 B1

VEHICLE STEP DEVICE

BACKGROUND OF THE INVENTION

1. Field of the Invention

The present invention relates to vehicle booster steps and more particularly pertains to a new vehicle booster step which is attachable to a pick-up truck for aiding a person in reaching into the bed of the pick-up truck.

2. Description of the Prior Art

The use of vehicle booster steps is known in the prior art. U.S. Pat. No. 3,671,058 provides one such device which is intended for pick-up trucks. While these devices fulfill their respective, particular objectives and requirements, the need remains for a device that is easily retrofittable to existing vehicles and which is efficient in operation.

SUMMARY OF THE INVENTION

The present invention meets the needs presented above by including a base unit which can be retrofitted to the bottom of a pick-up bed in the position desired by the user.

Another object of the present invention is to provide a new vehicle booster step that includes a panel having a non-slip surface.

Still another object of the present invention is to provide a new vehicle booster step that includes a securing assembly for selectively locking the panel in a retracted position.

To this end, the present invention generally comprises a base unit including a bottom wall and a pair of side walls that are attached to and extend upwardly from the bottom wall. The side walls are positioned opposite of each other and each has an top edge. Each of a pair of brackets is attached to one of the top edges of the side walls for selectively coupling the base unit to a vehicle. Each of a pair of guides is mounted to an inner surface of one of the side walls. A panel has an upper surface, a lower surface, a pair of side edges, a back edge and a front edge. Each of a pair of rails is attached to and extends along one of the side edges. Each of the rails is positionable into one of the guides such that the panel is selectively positionable between an extended position extending outwardly of the base unit and a retracted position positioned inward of the base unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic side view of the present invention.

FIG. 4 is a schematic cross-sectional view taken along line 4—4 of FIG. 2 of the present invention.

DESCRIPTION OF THE PREFERRED EMBODIMENT

Figure 1:
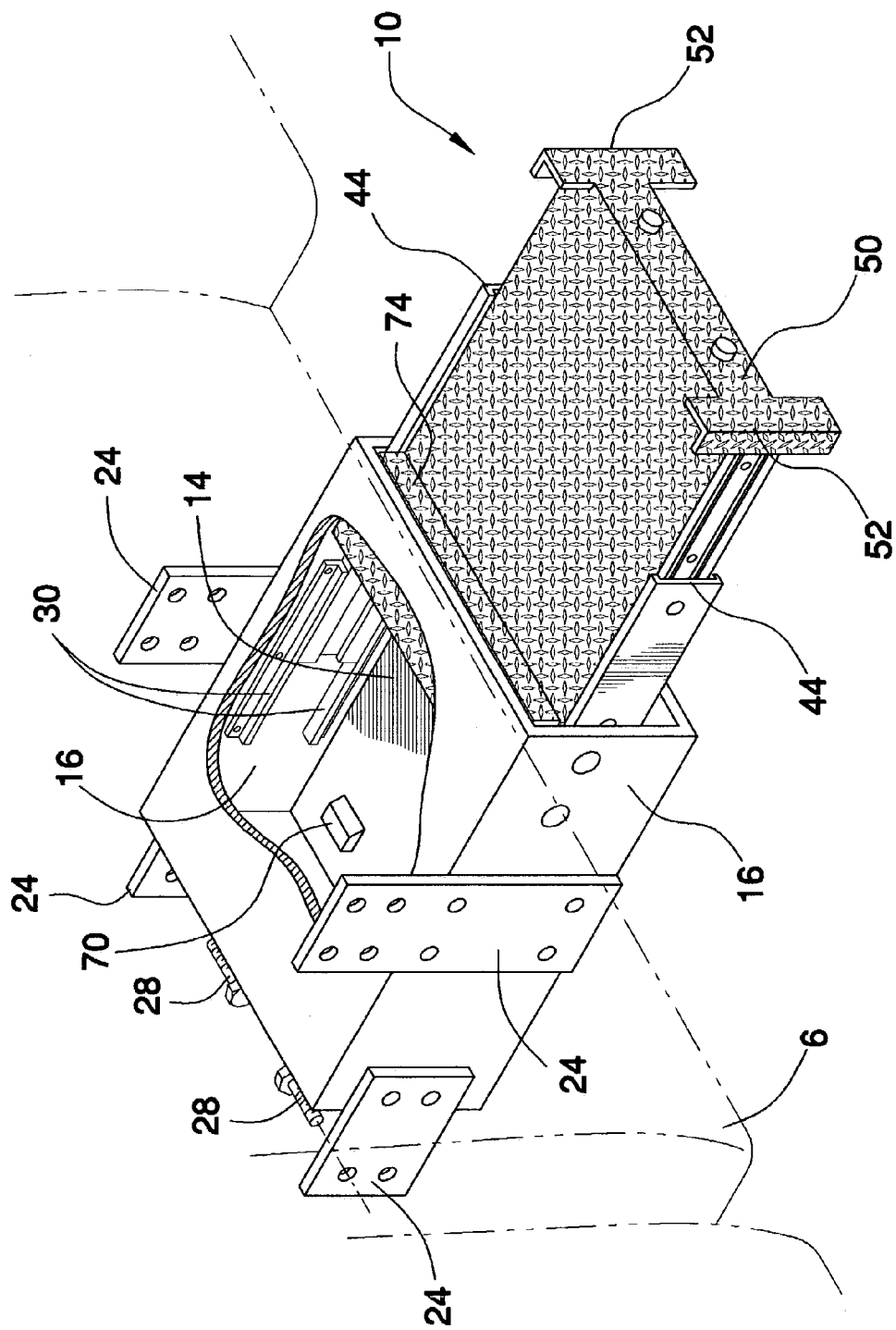
FIG. 1 is a schematic perspective view of a vehicle step device according to the present invention.
Figure 2:
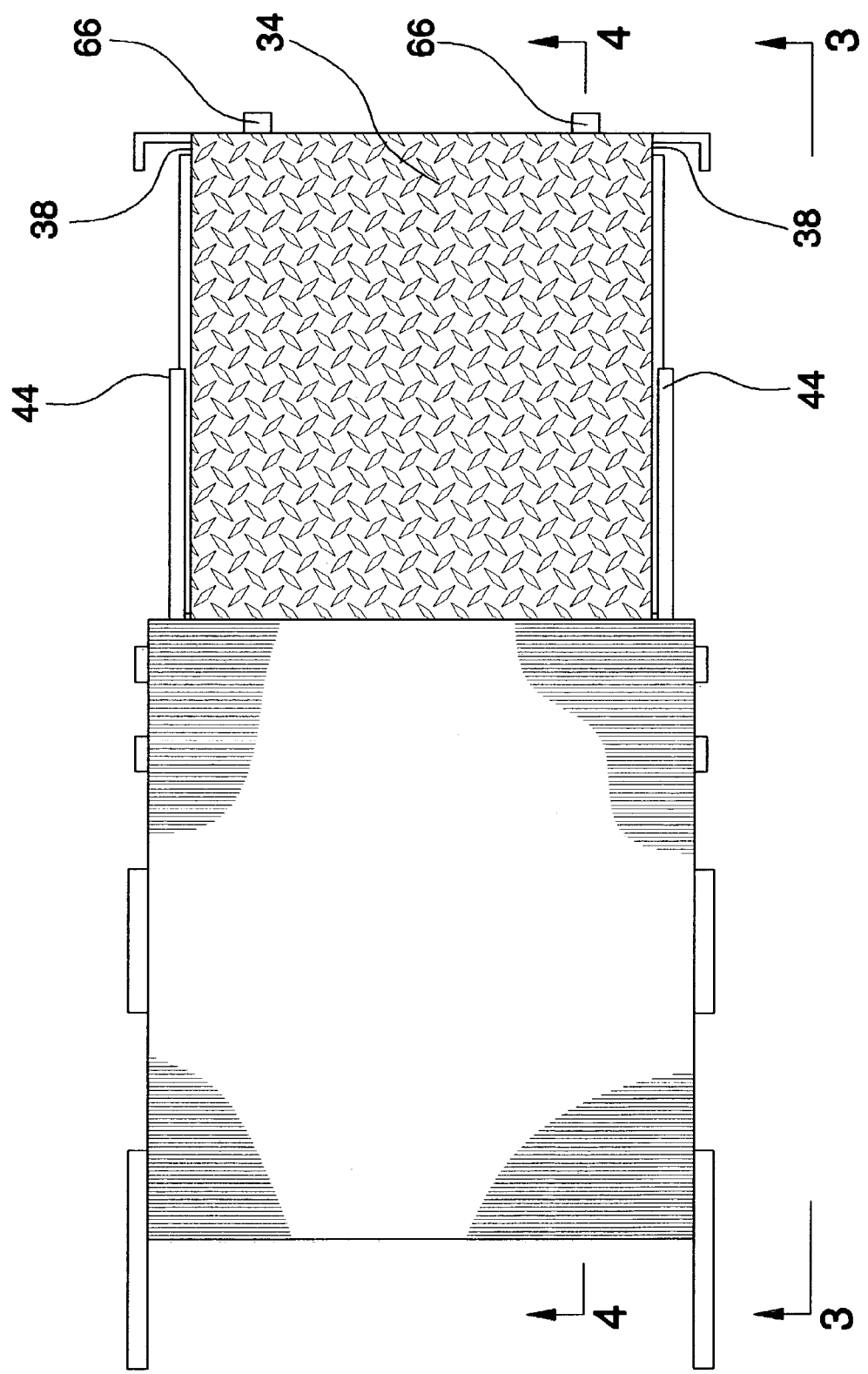
FIG. 2 is a schematic plan view of the present invention.

With reference now to the drawings, and in particular to FIGS. 1 through 4 thereof, a new vehicle booster step embodying the principles and concepts of the present invention and generally designated by the reference numeral 10 will be described.

As best illustrated in FIGS. 1 through 4, the vehicle step device 10 generally comprises a base unit 12 including a bottom wall 14 and a pair of side walls 16 that are attached to and extend upwardly from the bottom wall 14. The side walls 16 are positioned opposite of each other. Each of the side walls 16 has a back edge 20 and a forward edge 22. An upper wall 18 and a back wall 19 are optionally attached to the base unit to form a housing.

Each of a pair of brackets 24 is attached to one of the side walls 16 for selectively coupling the base unit 12 to a vehicle 6. The brackets 24 may be any conventional mechanical fastener which may be used for attaching the base unit 12 to a bottom surface of the vehicle 6. Each of brackets 24 preferably comprises plates that extend outwardly away from the base unit 12. Each of the brackets 24 has a plurality of apertures 26 extending therethrough. The apertures are each adapted for receiving one of a plurality of securing members 28. The securing members 28 preferably comprise bolts or the like. The brackets preferably include at least one pair of brackets and more preferably two pairs of brackets.

Each of a pair a pair of guides 30 is mounted to an inner surface of one of the side walls 16. The guides 30 are positioned opposite of each other. The guides 30 are elongated and are positioned within a plane orientated substantially parallel to the bottom wall 14. A pair of spaced elongated members 31 forms each of the guides 30.

A panel 32 has an upper surface 34, a lower surface 36, a pair of side edges 38, a back edge 40 and a front edge 42. The upper surface 34 preferably has a non-slip, roughened surface.

Each of a pair of rails 44 is attached to and extends along one of the side edges 38. Each of the rails 44 is positionable into one of the guides 30 such that the panel 32 is selectively positionable between an extended position extending outwardly of the base unit 12 and a retracted position positioned inward of the base unit 12. The rails 44 shown include an inner section 46 and an outer section 48 telescopically coupled to each other.

An outer wall 50 is preferably attached to and extends along the front edge 42 of the panel 32. The outer wall 50 has a length longer than a distance between the side walls 16 of the base unit 12 so that the outer wall 50 extends outwardly beyond the forward edges 22 of the side walls 16 when the panel 32 is positioned in the base unit 12. The outer wall 50 has a pair of bends 52 therein such that the outer wall 50 extends around the side walls 16 of the base unit 12 when the panel 32 is in the retracted position. The outer wall 50 prevents the panel 32 from extending outwardly through a back end of the base unit 12 if there is no back wall 19, and gives an attractive appearance, particularly when covered with chrome, which hides the base unit 12.

A locking assembly 60 includes a first locking assembly and a second locking assembly. The first locking assembly attached to the panel 32 for selectively locking the panel 32 in the retracted position. The first locking assembly preferably includes a pair of poles 62 being slidably mounted to the bottom surface 36 of the panel 32. The poles 62 each have an inner end 64 positioned below the panel 32 and an outer end 66 extending outwardly beyond the front edge 42 of the panel 32. Each of the inner ends 64 are mechanically coupled to rods 68 which are lifted upwardly when the outer ends 66 of the poles 62 are pushed inward and which extend downward when the outer ends 66 are extended outwardly away of the panel 32. The rods 68, when extended downward while the panel 32 is in the retracted position, engage catches 70 attached to the bottom wall 14 to hold the panel 32 in the retracted position. The second locking assembly includes all of the same parts of the first locking assembly, however, the second locking assembly also includes forward catches 72 for engaging the rods when the panel 32 is in the extended position for preventing the panel 32 from moving toward the retracted position. A rearward positioned lip 76 on the panel 32 engages a downwardly extending flange 74 attached to the top wall 18 for preventing the panel 32 from falling outward of the base unit 12.

In use, the base unit 12 is attached to the bottom surface of a vehicle 6, preferably to the bed of a pick-up truck adjacent to the cab. This allows the user to step on the panel 32, when it is extended, so that the user may reach into the bed portion of the truck without having to climb into bed. This is especially helpful for those persons having toolboxes positioned in the bed which are positioned adjacent to the cab of the truck.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable step device for releasably securing to the bottom surface of a vehicle, said device comprising:
    a base unit including a bottom wall and a pair of side walls being attached to and extending upwardly from said bottom wall, said side walls being positioned opposite of each other;
    at least one pair of brackets, each of said brackets being attached to one of said side walls for selectively coupling said base unit to the vehicle;
    a pair of guides, each of said guides being mounted to an inner surface of one of said side walls;
    a panel having an upper surface, a lower surface, a pair of side edges, a back edge and a front edge; and
    a pair of rails, each of said rails being attached to and extending along one of said side edges, each of said rails being positionable into one of said guides such that said panel is selectively positionable between an extended position extending outwardly of said base unit and a retracted position positioned inward of said base unit.

2. The retractable step device of claim 1, wherein each of brackets extends outwardly away from said base unit, each of said brackets having a plurality of apertures extending therethrough for removably receiving a securing member.

3. The retractable step device of claim 1, wherein said upper surface has a roughened surface.

4. The retractable step device of claim 1, further including an outer wall being attached to and extending along said front edge of said panel.

5. The retractable step device of claim 4, wherein said outer wall has a length longer than a distance between said side walls of said base unit.

6. The retractable step device of claim 5, wherein said outer wall having a pair of bends therein such that said outer wall extends around said side walls of said base unit when said panel is in said retracted position.

7. The retractable step device of claim 1, further including a first locking assembly being attached to said panel for selectively locking said panel in said retracted position.

8. The retractable step device of claim 7, further including a second locking assembly being attached to said panel for selectively locking said panel in said extended position.

9. A retractable step device for releasably securing to the bottom surface of a vehicle, said device comprising:
    a base unit including a bottom wall and a pair of side walls being attached to and extending upwardly from said bottom wall, said side walls being positioned opposite of each other, each of said side walls having a back edge and a front edge;
    at least one pair of brackets, each of said brackets being attached to one of said side walls for selectively coupling said base unit to the vehicle, each of brackets extending outwardly away from said base unit, each of said brackets having a plurality of apertures extending therethrough for removably receiving a securing member;
    a pair of guides, each of said guides being mounted to an inner surface of one of said side walls, said guides being positioned opposite of each other, each of said guides being positioned within a plane orientated substantially parallel to said bottom wall;
    a panel having an upper surface, a lower surface, a pair of side edges, a back edge and a front edge, said upper surface having a roughened surface;
    a pair of rails, each of said rails being attached to and extending-along one of said side edges, each of said rails being positionable into one of said guides such that said panel is selectively positionable between an extended position extending outwardly of said base unit and a retracted position positioned inward of said base unit;
    an outer wall being attached to and extending along said front edge of said panel, said outer wall having a length longer than a distance between said side walls of said base unit, said outer wall having a pair of bends therein such that said outer wall extends around said side walls of said base unit when said panel is in said retracted position; and
    a locking assembly being attached to said panel for selectively locking said panel in said retracted position.

* * * * *